(No Model.)
W. H. TAYLOR.
KNOB AND METHOD OF MAKING SAME.
No. 563,693. Patented July 7, 1896.
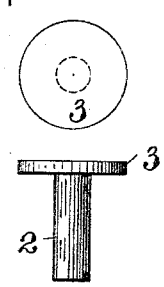
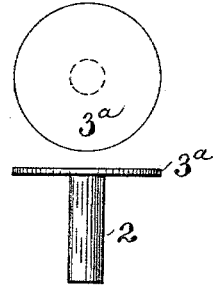
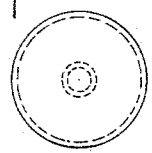
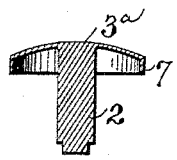
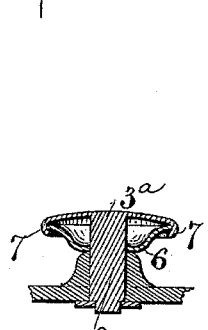
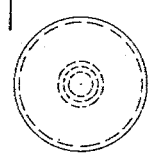
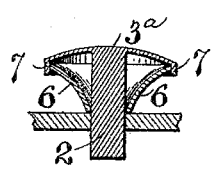
Witnesses
Walter E. Allen
Geo. E. Cryne
Inventor.
Warren H. Taylor
By Knight Bros.
Attorneys.
THE NORRIS PETERS CO., PHOTO-LITHO., WASHINGTON, D. C.

UNITED STATES PATENT OFFICE.

WARREN H. TAYLOR, OF STAMFORD, CONNECTICUT, ASSIGNOR TO THE YALE & TOWNE MANUFACTURING COMPANY, OF SAME PLACE.

KNOB AND METHOD OF MAKING SAME.

SPECIFICATION forming part of Letters Patent No. 563,693, dated July 7, 1896.

Application filed December 7, 1895. Serial No. 571,423. (No model.)

*To all whom it may concern:*

Be it known that I, WARREN H. TAYLOR, a citizen of the United States, residing at Stamford, in the county of Fairfield and State of Connecticut, have invented certain new and useful Improvements in Knobs and Methods of Making the Same, of which the following is a specification.

My present invention relates more particularly to an improvement in that class of knobs and method of making the same which are adapted to be used for rigid attachment to various articles, as for example to transom-lifts, where it is desired to have a firm support for the head, so that when subjected to any strain the shape of the head will not be distorted. I produce such a knob in the manner hereinafter set forth, and in order that my invention may be fully understood I will proceed to describe the same with reference to the accompanying drawings, in which—

Figure 1 is a view of a portion of a rod out of which the head and shank of the knob are formed. Fig. 2 is a view showing the form of the rod after the first upsetting, and Fig. 3 is a view showing the upset portion further flattened. Figs. 4, 5, and 6 are views showing several forms in which the knob may be finished.

Referring to the drawings, 1 represents a portion of a solid rod of metal out of which the head and shank of the knob are formed. The first step in the manufacture of these parts is to upset the rod to the form shown in Fig. 2, so as to form the shank 2 and the flat portion 3 out of which the head is formed. The portion 3 is then further flattened, as shown in Fig. 3, and the head $3^a$ is then formed, as shown in Fig. 4, with an annular flange 7. The shank is also finished in any suitable manner, so that the knob can be attached to any device by any preferred means.

In Fig. 5 I have shown the knob finished by securing cups 6 within the head by inturning the flange 7, and in the form shown in Fig. 6 the cups are held in the head simply by their resting against the device to which the knob is secured. It will be seen from the above that the knob can be finished in any suitable manner and with any preferred design without departing from the spirit of my invention.

The advantage of such a construction, in addition to its cheapness, is that the shank being solid gives a firm support to the head, which is, as shown, formed integral, so that in using the knob for various purposes, as for instance, as above stated, in connection with a transom-lift or where there is any strain, the head will not become distorted, and further that additional parts can be secured to the shank without damaging the knob.

Having thus described my invention, the following is what I claim as new therein and desire to secure by Letters Patent:

1. In the manufacture of knobs the method of forming the head and shank substantially as herein described which consists in taking a solid metal rod 1, then upsetting an end thereof to form a flat portion 3, then further flattening said portion to form a head $3^a$ and then turning the outer portion of the head into a lip to form an inwardly-projecting peripheral flange.

2. A knob comprising a stem 2 and a head $3^a$ upset from a solid metal rod having an inwardly-projecting peripheral flange 7 and a cup 6, having its rim fitting within the flange of the head; substantially as described.

WARREN H. TAYLOR.

Witnesses:
SCHUYLER MERRITT,
GEO. E. WHITE.